April 30, 1957 C. W. BESSERER, JR 2,790,304
VARIABLE-AREA CONSTRICTOR FOR RAMJET DIFFUSER
Original Filed June 30, 1952
2 Sheets-Sheet 1

CARL W. BESSERER, JR.
INVENTOR

BY

ATTORNEYS

CARL W. BESSERER, JR
INVENTOR

United States Patent Office 2,790,304
Patented Apr. 30, 1957

2,790,304

VARIABLE-AREA CONSTRICTOR FOR RAMJET DIFFUSER

Carl W. Besserer, Jr., Silver Spring, Md., assignor to the United States of America as represented by the Secretary of the Navy Original application June 30, 1952, Serial No. 296,381. Divided and this application March 31, 1954, Serial No. 424,290

2 Claims. (Cl. 60—35.6)

The present invention relates generally to an improved aerial missile of the ramjet type, and more particularly it relates to an arrangement for controlling the area of the intake to the duct at the forward end of the missile. This application is a division of copending U. S. patent application Serial No. 296,381, filed June 30, 1952, by the same inventor.

In operating ramjet missiles, the air-fuel ratio for most efficient propulsion varies with the speed and with atmospheric density. One method of controlling this ratio is by controlling the rate of flow of the fuel into the combustion chamber. This method, however, makes no provision for extreme fluctuations of air velocity, and it is possible that ignition difficulties might occur with excessive air velocity. Therefore, a method of controlling the amount and, hence, the velocity of the air passing through the duct is desirable. An important requirement of such a control is that it should not cause unsymmetrical flow in the duct, that is, the velocity pattern across the stream should be the same in every direction from the axis.

Accordingly, it is an object of the present invention to provide an arrangement for permitting suitable control of the air admission to the intake of the duct at the forward end of the ramjet aerial missile.

Another object of the invention is to provide an air admission arrangement for ramjet types of missiles which will be simple in arrangement, and reliable and efficient in operation.

Another object of the invention is to provide a variable area constrictor arrangement for aerial missiles of the ramjet type for controlling the rate of flow of the air therein.

Other objects and many of the attendant advantages of this invention will be readily appreciated as the same becomes better understood by reference to the following detailed description when considered in connection with the accompanying drawings wherein.

According to the invention, an arrangement or means is provided for controlling the area of the intake to the duct at the forward end of an aerial missile of the ramjet type for varying the air-fuel ratio to obtain the most efficient propulsion system as velocity and atmospheric density vary. The arrangement includes a central body suitably supported by struts in spaced relation within the ramjet missile in order to provide an annular duct surrounding the central body.

The forward portion of the central body is of conical shape and is longitudinally movable to cooperate with a rearwardly diverging forward section of the missile for regulating the flow of air through the duct. A motor-driven screw, in response to impulses from suitable control apparatus in the missile, is adapted to adjust the position of the conical forward portion of the central body with respect to the diverging section of the missile to vary and determine the cross-sectional area of the missile duct.

A bellows motor may be used instead of the motor-driven screw for adjusting the position of the conical forward portion of the central body. The bellows is placed between the movable forward portion and the remaining portion of the central body and it is connected to a source of pressure for operating the same.

For that type of aerial missile of the ramjet type having no central body, the air flow through the axial duct thereof can be regulated by means of a circumferential gap near the forward end in the inner metallic skin of the missile over which a flexible sleeve is fitted and which is surrounded by one or more Bourdon tubes. Additional means are provided for adjusting the pressure in the Bourdon tubes, so that the sleeve can be radially positioned to control the cross-sectional area of the missile duct.

Figure 1:
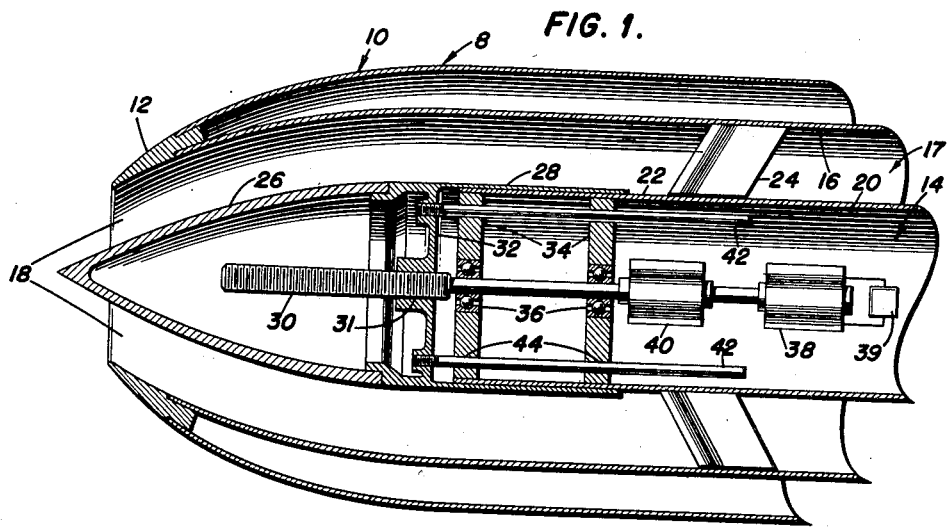
Fig. 1 is an axial section of the forward portion of an aerial missile of the ramjet type, illustrating a screw-operated, axially located area constrictor.

Referring now to Fig. 1 of the drawings, there is illustrated an aerial missile 8 of the ramjet type having a tubular outer body 10 formed with a generally frusto-conical forward portion 12, and a central body 14. This central body 14 and the inner surface 16 of the outer body 10 define an annular duct 17 with an air intake 18 at its forward end.

The central body 14 comprises a rear section 20 having a cylindrical forward portion 22. Section 20 is rigidly supported in the missile by struts 24. A front section 26 is also provided in body 14 and it is movable longitudinally with respect to the rear section 20 and terminates in a rearwardly projecting cylindrical sleeve 28 enclosing the cylindrical portion 22 of the rear section 20.

The front section 26 is positioned with respect to the rear section 20 by a threaded axial shaft 30 which engages an axial threaded bore 31 in a bulkhead 32 in the front section 26 and is rotatably supported in corresponding bulkheads 34 in the rear section 20 by suitable bearings 36. The shaft 30 is rotated by a motor 38 located in section 20. Motor 38 operates through a suitable reduction gear 40. Rotation of the front section 26 is prevented by rearwardly projecting rods 42 secured in the bulkhead 32 and passing through guide apertures 44 in the bulkheads 34.

In operation, the front section 26 of the central body 14 is moved longitudinally with respect to the rear section 20 and the outer body 10 by means of motor 38 in response to impulses from suitable control apparatus in the missile. Forward motion of the section 26 tends to reduce the area of the air intake 18 formed between section 26 and the conical portion 12 of the outer body 10; while rearward motion tends to increase the area. Thus, the quantity of air flowing through the duct of the missile is controlled by the position of the front section 26.

Figure 2:
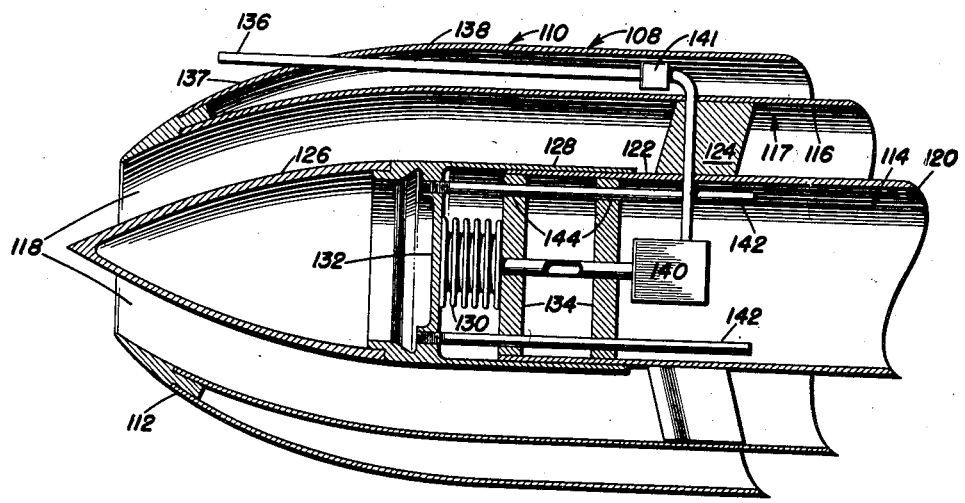
Fig. 2 is a view similar to that of Fig. 1, showing a missile fitted with a bellows-operated, axially located area constrictor.

In another modification of the invention, there is shown fragmentarily in Fig. 2, a ramjet missile 108 having an outer tubular body 110 formed with a frusto-conical forward portion 112, and a central body 114. This central body 114 and an inner surface 116 of the outer body 110 define an annular air duct 117 having an air intake 118 at its forward end.

The central body 114 comprises a rear section 120 having a cylindrical forward portion 122, with section 120 being rigidly supported in the outer body by struts 124, and a front section 126 movable longitudinally with respect to the rear section 120 and terminating in a rearwardly projecting cylindrical sleeve 128 enclosing the cylindrical portion 122 of the rear section 120.

The front section 126 is positioned with respect to the rear section 120 by a bellows 130 which is interposed between a bulkhead 132 in front section 126 and the forward one of a pair of similar bulkheads 134 in the rear section. The extension of the bellows 130 is caused by high-pressure air supplied thereto from a Pitot tube 136 in the forward end 137 of the tubular body 110 through a tube 138 leading to the central body 114 through one of the struts 124, and regulated by suitable control means such as a control valve 140. Rearwardly projecting rods 142 secured in the bulkhead 132 and passing through apertures 144 in the bulkheads 134 serve to hold the front section 126 in alignment with the rear section 120.

In use, the front section 126 of the central body 114 is moved longitudinally with respect to the rear section 120 and the outer body 110 by the action of high-pressure air in the bellows 130. The pressure in the bellows 130 is regulated by the control valve 140 which is actuated by impulses from control apparatus in the missile. The relative separation of the two sections 120 and 126 increases with increased air pressure, and vice versa, to achieve control of the area of the air intake 118 in the same manner as hereinbefore described in connection with the embodiment of Fig. 1.

Figure 3:
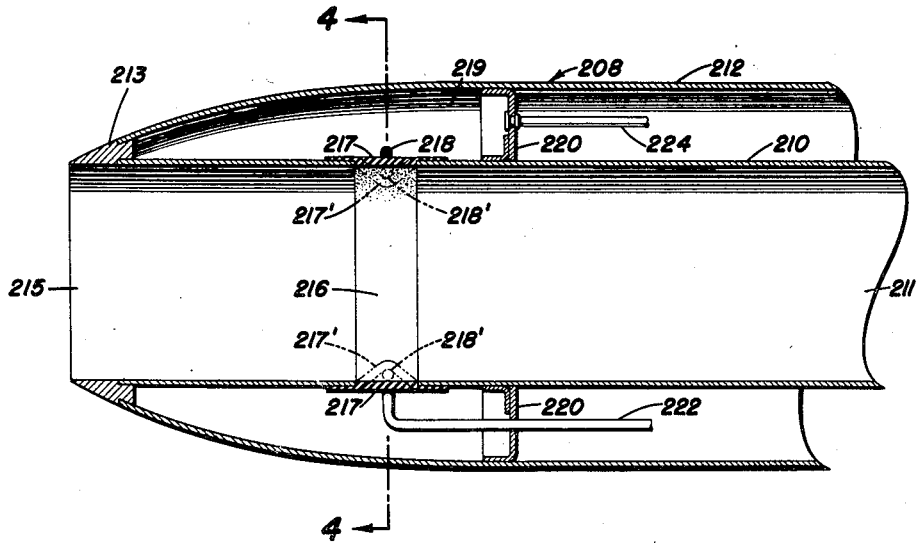
Fig. 3 is an axial section of the forward part of an aerial missile having no central body, and showing a radially moving area constrictor for use therein.
Figure 4:
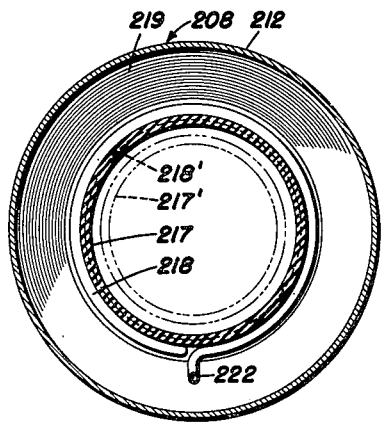
Fig. 4 is a section on line 4—4 of Fig. 3.

A ramjet missile 208 having no central body is shown fragmentarily in Fig. 3 and in transverse section in Fig. 4. This missile is formed with an inner tubular metallic skin 210 defining an axial duct 211 and an outer skin 212 concentric with and spaced from the inner skin 210 except at the forward end 213 of the missile where it is tapered to meet the inner skin. At the forward end 215 of the duct 211 a circumferential gap 216 in the inner metallic skin 210 is closed by a sleeve 217 of rubber or similar material fastened to the metal in an airtight manner. A Bourdon tube 218 surrounds the sleeve 217 in an annular chamber 219 defined by the inner skin 210, the sleeve 217, the outer skin 212 and a rear bulkhead 220. A tube 222, passing through the bulkhead 220, connects the Bourdon tube 218 with control equipment (not shown), and a tube 224 from the control equipment opens into the chamber 219.

The chamber 219 and the Bourdon tube 218 together form a differential pressure system in which a pressure in the chamber greater than that in the Bourdon tube 218 causes the latter to assume a shorter radius of curvature, resulting in a change of position to that indicated at 218', thereby contracting on the outer surface of the sleeve 217 to force it radially inward. The sleeve, under such radially exerted force, assumes a shape such as that indicated by the dashed line 217', thereby reducing the area of the duct 211. The amount of this constrictive action is dependent on the differential pressure between the chamber 219 and the Bourdon tube 218.

The value of the differential pressure is regulated by the control equipment in such a manner as to produce a constriction which permits the proper amount of air to enter the duct.

A modification of the method shown in Figs. 3 and 4 employs a Bourdon tube which is smaller in diameter than the throat of the missile when no internal pressure is applied to it, so that it takes the position indicated at 218' and forces the sleeve 217 to the position 217'. Under operating conditions, pressure is applied to the tube to expand it and increase the area of the passage through the sleeve. Maximum pressure expands the tube to the position originally indicated for 218 and permits the sleeve to assume the original position of 217. Constrictions intermediate between the limits 217 and 217' are obtained by regulating the pressure in the Bourdon tube by suitable control means, not shown.

While the variable constrictor of Figs. 3 and 4 has been shown and described as employing one Bourdon tube, it is not intended that such constrictors shall be limited to one such tube since, for constructional or operational reasons, it may be desirable to employ two or more tubes arranged side by side and operating on the sleeve 217 either in unison or selectively, as circumstances may require.

Obviously many modifications and variations of the present invention are possible in the light of the above teachings. It is therefore to be understood that within the scope of the appended claims the invention may be practiced otherwise than as specifically described.

What is claimed is:

1. In an aerial missile of the ramjet type having an outer wall and an inner wall defining an unobstructed central duct, portions of said walls defining a chamber, said inner wall consisting of spaced portions between said chamber and said duct, means for regulating the flow of air through said duct including a flexible sleeve connecting said spaced portions to form a portion of the throat of said duct, a Bourdon tube surrounding and constrictable on said sleeve, and means for differentially adjusting the pressure in said Bourdon tube as well as said chamber to thereby radially position said sleeve to control the cross-sectional area of said throat.

2. In an aerial missile of the ramjet type having an outer wall and an inner wall defining an unobstructed central duct, portions of said walls defining a chamber, said inner wall consisting of spaced portions between said chamber and said duct, structure for regulating the flow of air through said duct including a flexible member connecting said spaced portions to form a portion of the throat of said duct, a Bourdon tube surrounding said flexible member and arranged to be constrictable thereon, and means for differentially adjusting the pressure in said Bourdon tube and said chamber to cause said Bourdon tube to constrict, thereby positioning said flexible member to control the cross-sectional area of said throat.

References Cited in the file of this patent

UNITED STATES PATENTS

| | | |
|---|---|---|
| 2,409,433 | Hunter | Oct. 15, 1946 |
| 2,434,835 | Colley | Jan. 20, 1948 |
| 2,569,996 | Kollsman | Oct. 2, 1951 |
| 2,596,435 | Robert | May 13, 1952 |
| 2,737,019 | Billman | Mar. 6, 1956 |

FOREIGN PATENTS

| | | |
|---|---|---|
| 162,381 | Switzerland | Sept. 1, 1933 |
| 789,467 | France | Aug. 19, 1935 |